(12) United States Patent
Armbruster et al.

(10) Patent No.: US 7,609,664 B2
(45) Date of Patent: Oct. 27, 2009

(54) METHOD AND SYSTEM FOR BROADCASTING/MULTICASTING IN A COMMUNICATION NETWORK

(75) Inventors: Peter J. Armbruster, Chandler, AZ (US); Nandakishore A. Albal, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 699 days.

(21) Appl. No.: 11/457,183

(22) Filed: Jul. 13, 2006

(65) Prior Publication Data
US 2008/0016536 A1 Jan. 17, 2008

(51) Int. Cl.
*H04J 1/00* (2006.01)
*H04J 3/26* (2006.01)
*H04N 7/16* (2006.01)

(52) U.S. Cl. ............... 370/312; 370/328; 370/389; 370/432; 725/62; 725/144

(58) Field of Classification Search .......... 370/312, 370/328, 326, 336, 345–347, 389, 390, 431, 370/432, 477, 489; 725/78, 81, 62, 114, 725/138, 144; 709/225, 231; 455/509, 518, 455/522
See application file for complete search history.

(56) References Cited

U.S. PATENT DOCUMENTS

| | | | |
|---|---|---|---|
| 7,349,359 B2* | 3/2008 | Chang et al. | 370/312 |
| 7,558,587 B2* | 7/2009 | Albal et al. | 455/509 |
| 2006/0126556 A1* | 6/2006 | Jiang et al. | 370/328 |
| 2007/0058628 A1* | 3/2007 | Palnati et al. | 370/390 |
| 2007/0220573 A1* | 9/2007 | Chiussi et al. | 725/114 |

* cited by examiner

Primary Examiner—Afsar M. Qureshi

(57) ABSTRACT

A method for providing a Broadcast/Multicast Service (BCMCS) content in a communication network (102) for managing the BCMCS content in the communication network is disclosed. The method includes receiving (404) a request for the BCMCS content from an AT (106). The method also includes directing (406) a content server (202) to initiate transmission of the BCMCS content. Further, the method includes establishing (408) a bearer channel between the content server and the AT.

20 Claims, 6 Drawing Sheets

METHOD AND SYSTEM FOR BROADCASTING/MULTICASTING IN A COMMUNICATION NETWORK

FIELD OF THE INVENTION

This invention relates in general to communication networks, and more specifically, to Broadcast Multicast Services (BCMCS) in communication networks.

BACKGROUND OF THE INVENTION

Nowadays, many mobile operators offer various value-added services such as broadcast/multicast services (BCMCS's) to customers. There are various methods for distributing BCMCS content in a communication network. In one such method, the flow of the BCMCS content is controlled by a third-party content provider. This method requires the third-party content provider to have knowledge of the network topology, and might cause security and safety threats. In another such method, certain communication standards define a way to distribute the BCMCS content in a communication network, for example, a Code Division Multiple Access 2000 (CDMA2000) network. However, the standards do not specify the roles performed by various network elements such as a network controller, a content server and a content provider, for distributing the BCMCS content in the communication network. Moreover, the standards do not specify the flow of the BCMCS content for all the standard call types, such as static and network-initiated calls in the communication network.

In light of the above discussion, there is a need for a method to distribute BCMCS content in a communication network while the network topology is prevented from being exposed to any third-party network element or service provider. Further, the method should specify the flow of content for all the standard call types, namely, dynamic, static and network-initiated calls. The method should also specify the role of each network element for the flow of BCMCS content. Furthermore, the method should be simple to implement.

BRIEF DESCRIPTION OF THE DRAWINGS

Representative elements, operational features, applications and/or advantages of the present invention reside inter alia in the details of construction and operation, as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the figures are illustrated for simplicity and clarity and have not necessarily been drawn to scale. For example, the dimensions of some of the elements in the figures may be exaggerated relative to other elements to help in improving an understanding of various embodiments of the present invention. Furthermore, the terms "first", "second", and the like herein, if any, are used inter alia for distinguishing between similar elements and not necessarily for describing a sequential or chronological order. Any of the preceding terms so used may be interchanged under appropriate circumstances, such that various embodiments of the invention described herein may be capable of operation in other configurations and/or orientations than those explicitly illustrated or otherwise described.

DETAILED DESCRIPTION OF THE INVENTION

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments, without departing from the spirit and scope of the invention.

A detailed description of an exemplary application, namely 'Method and System for Broadcasting/Multicasting in a Communication Network', is provided as a specific enabling disclosure that may be generalized to any application of the disclosed system, device and method for optimizing transcoder resources, in accordance with various embodiments of the present invention.

It should be noted that one or more of the elements described herein can be implemented as logical entities, physical entities or a combination of the logical entities and the physical entities.

Figure 1:
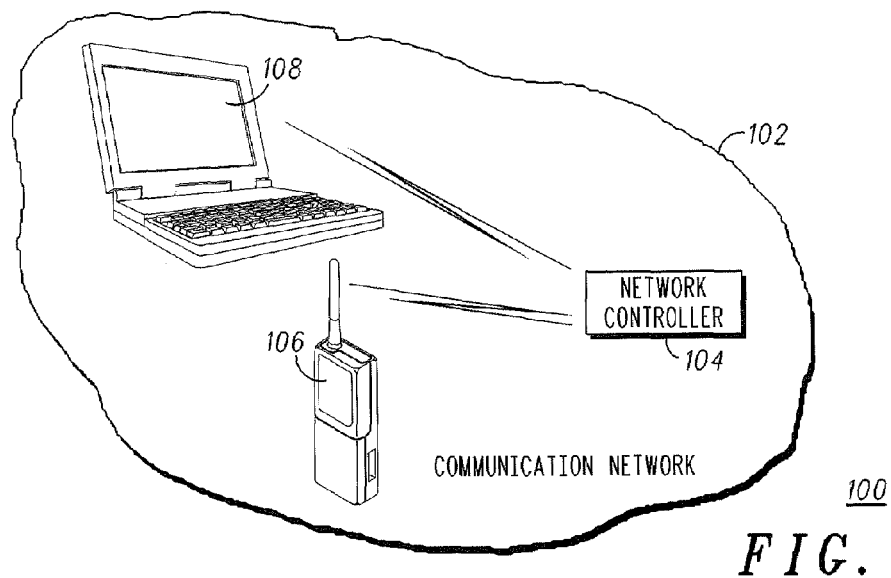
FIG. 1 representatively illustrates an environment where various embodiments of the present invention can be practiced.

FIG. 1 representatively illustrates an environment 100, where various embodiments of the present invention can be practiced. The environment 100 includes a communication network 102 and a network controller 104, an access terminal (AT) 106, and an AT 108 connected to the communication network 102. The communication network 102 can be, for example, a Code Division Multiple Access (CDMA) 200 network. The network controller 104 can control and manage transmission of Broadcast/Multicast Service (BCMCS) content. The BCMCS content can be audio, video or multimedia content. The BCMCS content is transmitted to the AT 106 and/or the AT 108. Examples of an AT can be a mobile phone, a laptop, a Personal digital Assistant (PDA), and so forth. Hereinafter, the invention will be explained with reference to the AT 106, for the purpose of clarity.

Figure 2:
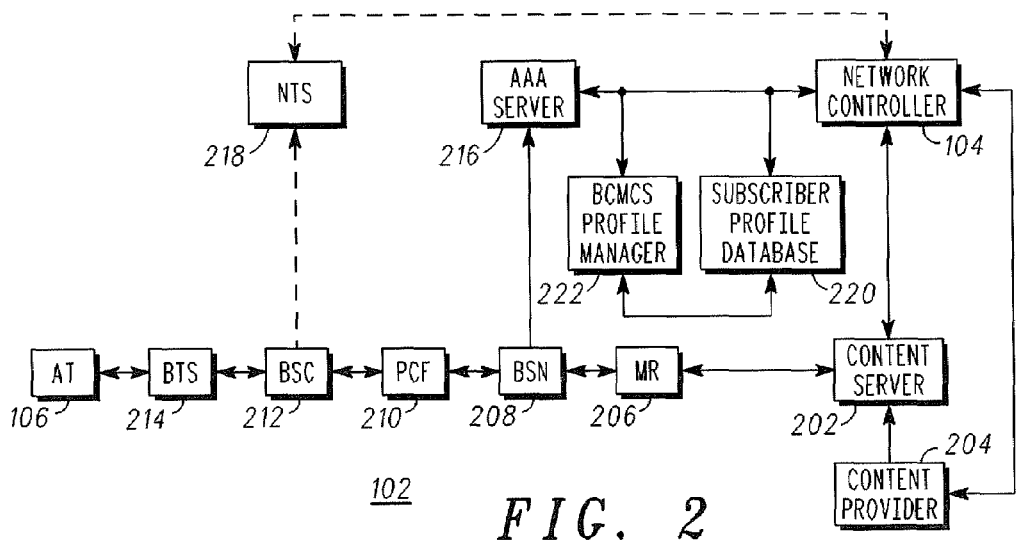
FIG. 2 representatively illustrates a block diagram of a communication network, in accordance with an exemplary embodiment of the present invention.

FIG. 2 representatively illustrates a block diagram of the communication network 102, in accordance with an exemplary embodiment of the present invention. The communication network 102 includes the network controller 104, the AT 106, a content server 202, a content provider 204, and one or more channel elements. The network controller 104 can control and manage the flow of BCMCS content in the communication network 102. It should be noted that though the network controller 104 is described to be associated with the communication network 102, the network controller 104 can be associated a plurality of communication networks as well. The content provider 204 provides the BCMCS content to the content server 202 for distribution. It should be noted that the content provider 204 can be a third-party element as well. The channel elements enable transmission of BCMCS content in the communication network 102. The channel elements include a Multicast Router (MR) 206, a Broadcast Serving Node (BSN) 208, a Packet Control Function (PCF) 210, a Base Station Controller (BSC) 212, and a Base Transceiver Station (BTS) 214.

The channel elements are interlinked in a hierarchical fashion in the communication network 102. For example, a BSN can have multiple PCFs connected to it, wherein the BSN can determine one or more PCFs for distribution of data packets. For example, the PCF 210 can receive data packets from the BSN 208. Further, the PCF 210 processes the data packets and determines one or more BSCs, for example, the BSC 212, for further distribution of the data packets. The BSC 212 handles the allocation of radio channels for further transmission of the data packets, and can transmit the data packets to, for example, the BTS 214. Thereafter, the BTS 214 transmits the data packets to, for example, the AT 106. It should be noted that examples of the channel elements are illustrated for the purpose of clarity, and the communication network 102 can include any other channel elements as well.

The communication network 102 also includes an Authentication Authorization and Accounting (AAA) server 216. The AAA server 216 can be communicably coupled with the network controller 104 and the BSN 208. The AAA server 216 enables authentication of the AT 106, provides authorization of services, and determines the services to be provided to the AT 106.

Further, the communication network 102 can include a subscriber profile database 220 and a BCMCS profile manager 222. The subscriber profile database 220 and the BCMCS profile manager 222 can store a profile of a subscriber and determine the services to be provided to the subscriber.

In an embodiment of the present invention, the communication network 102 can include a Network Topology Server (NTS) 218, which can be communicably coupled with the network controller 104 and the BSC 212. The NTS 218 can store information about the topology of the communication network 102. The NTS 218 is explained in further detail in conjunction with FIG. 3.

It should be noted that functionalities of the elements described above can also be implemented in any other network element or a combination of network elements.

Figure 3:
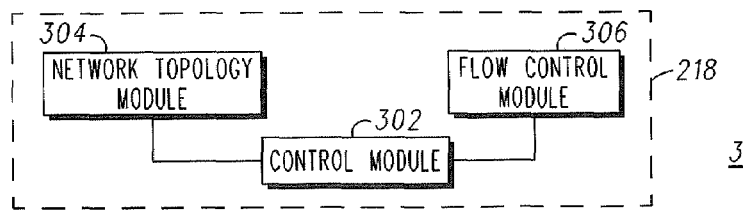
FIG. 3 representatively illustrates a block diagram of a Network Topology Server (NTS), in accordance with an exemplary embodiment of the present invention.

FIG. 3 representatively illustrates a block diagram of the NTS 218, in accordance with an exemplary embodiment of the present invention. The NTS 218 includes a control module 302, a network topology module 304, and a flow control module 306. The control module 302 can provide BCMCS content information to at least one channel element in the communication network 102. The BCMCS content information can include, for example, the broadcast schedule of various programs, such as a baseball match. Further, the control module 302 can include one or more operational commands, for example, application level commands and Operations, Administration, Maintenance and Provisioning (OAM&P) commands, to initiate the transmission of the BCMCS content information from the content provider 204. The network topology module 304 can store topology information related to the communication network 102. The topology information can include, for example, information about the way the various channel elements are connected in a communication network, the characteristics of the channel elements and resource allocations. The flow control module 306 can direct the network controller 104 in the communication network 102 to initiate transmission of the BCMCS content to a channel element. In an embodiment, the flow control module 306 can accept flow information from the network controller 104 to initiate transmission of the BCMCS content. The flow information can include, for example, details of the schedule of the news.

Figure 4:
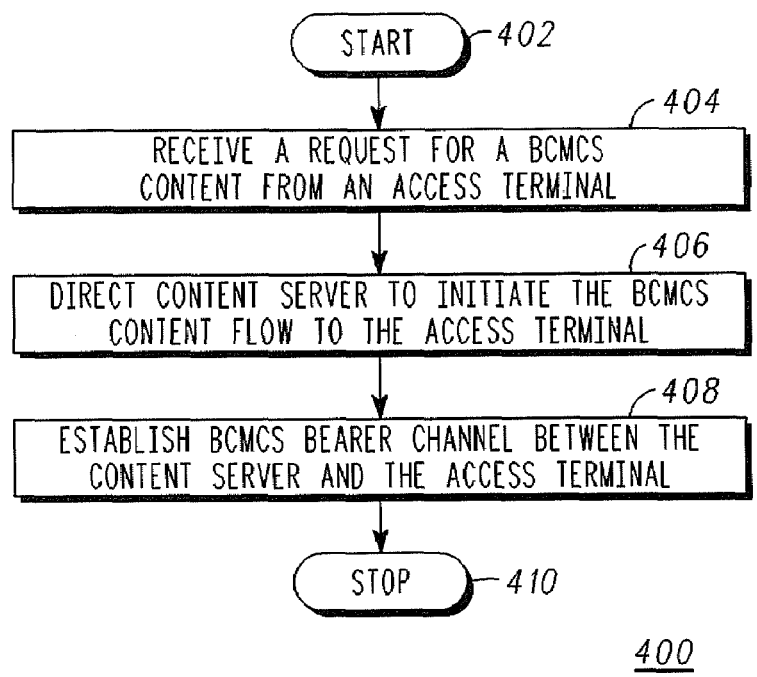
FIG. 4 representatively illustrates a flow diagram depicting a method for providing Broadcast/Multicast Service (BCMCS) content in a communication network, in accordance with a first exemplary embodiment of the present invention.

FIG. 4 representatively illustrates a flow diagram 400 depicting a method for providing BCMCS content to the AT 106 in the communication network 102, in accordance with a first exemplary embodiment of the present invention. At step 402, the method is initiated. At step 404, a request for the BCMCS content is received from the AT 106 at the network controller 102. At step 406, the network controller 104 directs the content server 202 to initiate transmission of the BCMCS content to the AT 106, based on the request from the AT 106 and the network topology information. The network topology information can include, for example, identification of the channel elements, based on their geographic location. In an embodiment, the network topology information can be stored at the network controller 102. In another embodiment, the network topology information can be stored at the NTS 218.

At step 408, a BCMCS bearer channel is established between the content server 202 and the AT 106. The BCMCS bearer channel enables transmission of the BCMCS content to the AT 106. The BCMCS bearer channel is established by using one or more channel elements such as the MR 206, the BSN 208, the PCF 210, the BSC 212, and the BTS 214. At step 410, the method terminates.

Figure 5:
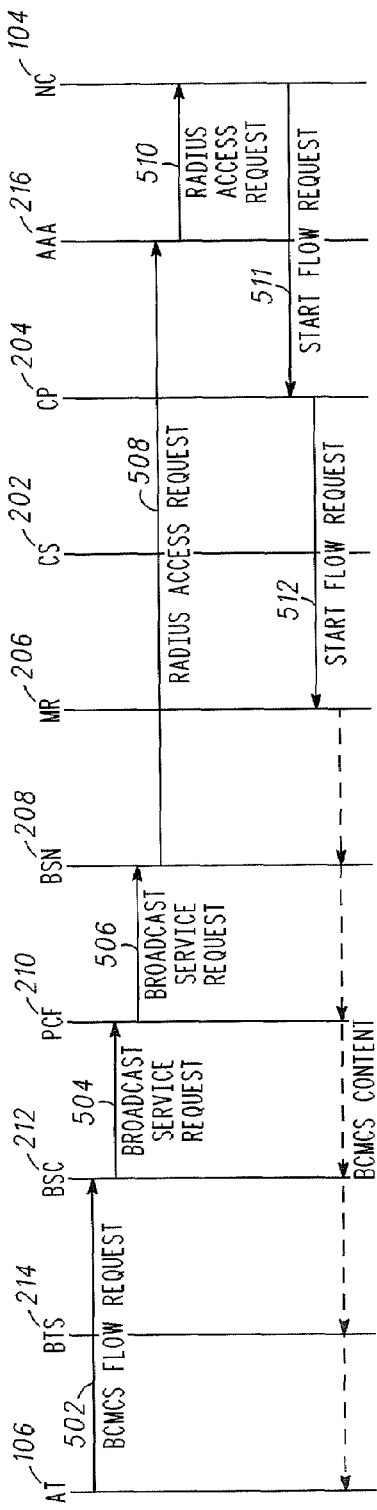
FIG. 5 representatively illustrates a BCMCS dynamic flow setup, in accordance with the first exemplary embodiment of the present invention.

FIG. 5 representatively illustrates a BCMCS dynamic flow setup, in accordance with a first exemplary embodiment of the present invention. According to known standards for a dynamic flow setup, transmission of the BCMCS content from a content server to an AT can be initiated on receiving a request for the BCMCS content from the AT. First, the AT 106 sends a BCMCS flow request 502 for desired BCMCS content to the BSC 212 through the BTS 214. The BCMCS flow request 502 is sent after the AT 106 is authenticated by one of the network controller 102, the content provider 204 or the AAA server 216. The BCMCS content information can include the list and/or schedule of available programs with the content provider 204. In an embodiment, the BCMCS content information is provided through a unicast channel between the network controller 104 and the AT 106. The unicast channel is a point-to-point signaling channel. The AT 106 can send the BCMCS flow request 502 to the BSC 212, based on the BCMCS content information. Thereafter, the BSC 212 sends a broadcast service request 504 to the PCF 210. On receiving the broadcast service request 504, the PCF 210 sends another broadcast service request 506 to the BSN 208. Further, the BSN 208 sends a radius access request 508 to the AAA server 216. The AAA server 216 then sends another radius access request 510 to the network controller 102.

Thereafter, the network controller 104 directs the content provider 204 to initiate transmission of the BCMCS content to the content server 202. Providing the desired BCMCS content to the AT 106, based on a request from the AT 106, is known as 'PULL'. For example, the content server 202 can transmit a cricket match when the AT 106 makes a request for it. In another embodiment, the content server 202 can initiate transmission of the BCMCS content at a predefined schedule. This is known as 'PUSH'. For example, the content server 202 can automatically initiate transmission of a football match at, for instance, 09:00 hours, irrespective of requests from AT 106. Further, the predefined schedule can be implemented as a timer function to enable automatic initiation of the transmission of the BCMCS content.

Further, the network controller 104 instructs the content provider 204 to initiate the transmission of the BCMCS content to content server 202 using a start flow request 511 and instructs the content server 202 to initiate transmission of the BCMCS content to one or more channel elements, using a start flow request 512. The BCMCS content is transmitted from the content server 202 to the AT 106 over a bearer channel, established by using channel elements in the communication network 102.

Figure 6:
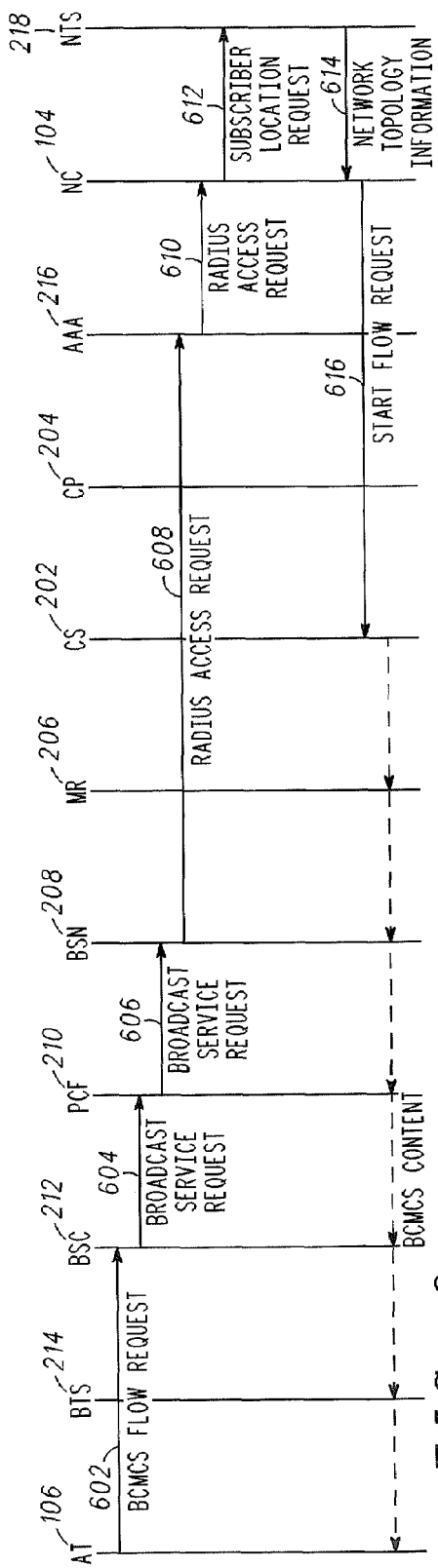
FIG. 6 representatively illustrates another BCMCS dynamic flow setup, in accordance with the first exemplary embodiment of the present invention.

FIG. 6 representatively illustrates another BCMCS dynamic flow setup, in accordance with the first exemplary embodiment of the present invention. Firstly, the AT 106 is authenticated and BCMCS content information is received at the AT 106. Thereafter, the AT 106 sends a BCMCS flow request 602 to the BSC 212. The BSC 212 sends a broadcast service request 604 to the PCF 210. Upon receiving the BCMCS flow request 602, the PCF 210 sends another broadcast service request 606 to the BSN 208. Thereafter, the BSN 208 sends a radius access request 608 to the AAA server 216. The AAA server 216 sends another radius access request 610 to the network controller 102.

Upon receiving the radius access request 610, the network controller 104 sends a subscriber location request 612 to the NTS 218, to obtain information about the network elements, enabling the transmission of the BCMCS content to the AT 106. The NTS 218 provides a network topology information 614 to the network controller 102. Further, the network controller 104 directs the content provider 204 to initiate transmission of the BCMCS content to the content server 202. The network controller 104 instructs the content server 202 to initiate transmission of the BCMCS content to the AT 106, using a start flow request 616. For transmission of the BCMCS content to the AT 106, a bearer channel is established between the content server 202 and the AT 106, using channel elements in the communication network 102.

Figure 7:
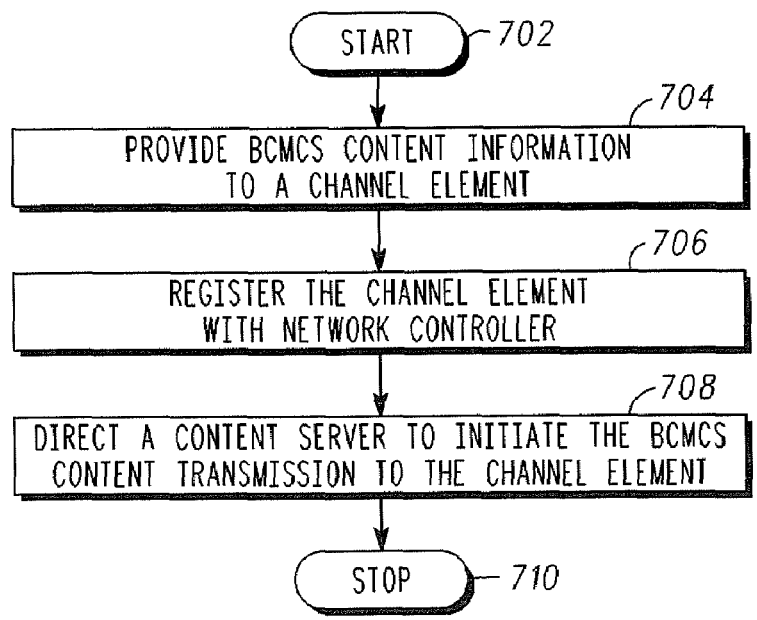
FIG. 7 representatively illustrates a flow diagram depicting a method for providing BCMCS content in a communication network, in accordance with a second exemplary embodiment of the present invention.

FIG. 7 representatively illustrates a flow diagram 700 depicting a method for providing BCMCS content in the communication network 102, in accordance with a second exemplary embodiment of the present invention. At step 702, the method is initiated. At step 704, BCMCS content information is provided to at least one channel element, based on network topology information. For one embodiment, the channel element can be the BSC 212. The network topology information can be stored at the network controller 104 and/or the NTS 218. At step 706, the channel element is registered as a proxy to the AT 106 at the network controller 102. At step 708, the network controller 104 directs the content server 202 to initiate transmission of the BCMCS content to the channel element.

In an embodiment, the network controller 104 can instruct the content server 202 to transmit the BCMCS content to the channel element, based on a request from at least one channel element. This is known as 'PULL'. In another embodiment, the network controller 104 can instruct the content server 202 to transmit the BCMCS content to the channel element, based on a predefined schedule. This is known as 'PUSH'.

Figure 8:
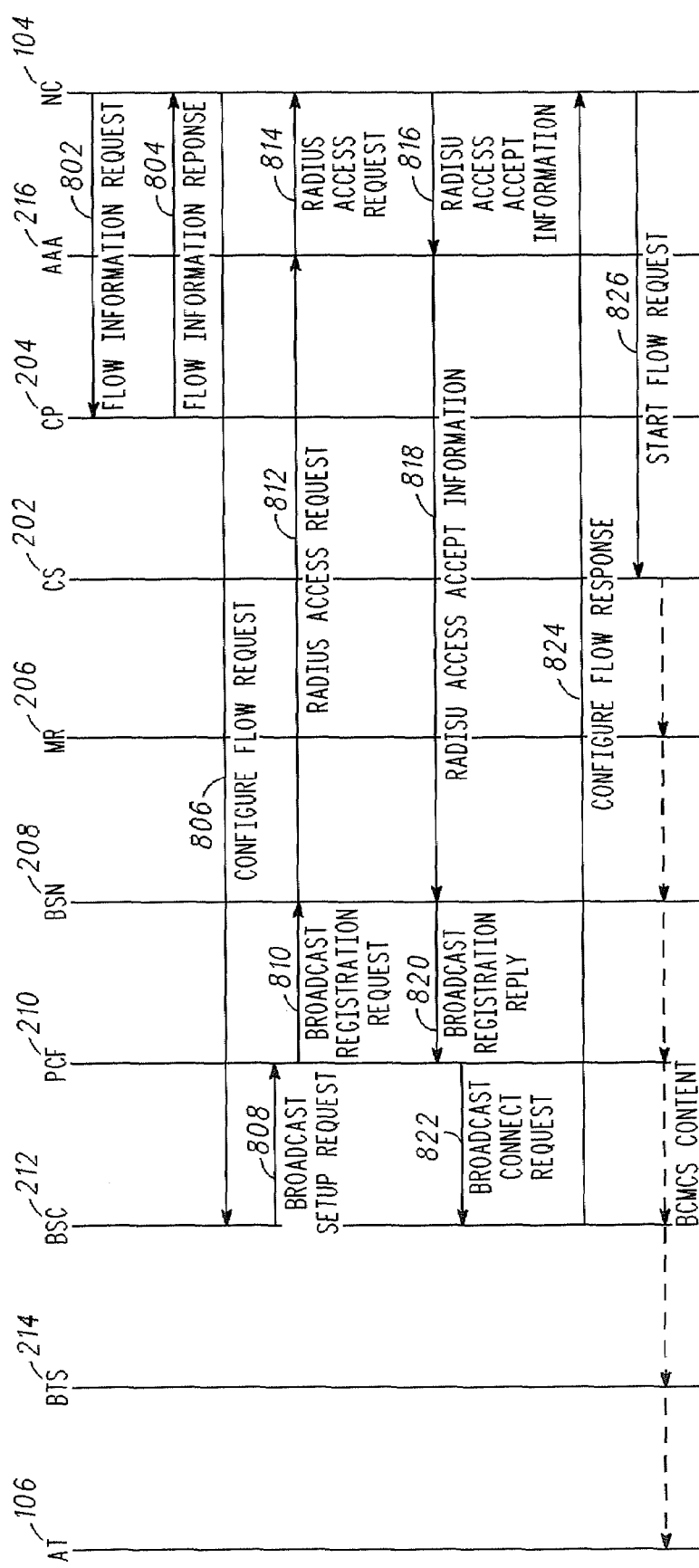
FIG. 8 representatively illustrates a BCMCS network-initiated flow setup, in accordance with the second exemplary embodiment of the present invention.

FIG. 8 representatively illustrates a BCMCS network-initiated flow setup, in accordance with the second exemplary embodiment of the present invention. According to known standards for a network-initiated flow setup, the transmission of the BCMCS content can be initiated by a network controller, irrespective of any requests made for the BCMCS content. First, the network controller 104 sends a flow information request 802 to the content provider 204, to obtain BCMCS content information. On receiving the flow information request 802, the content provider 204 sends a flow information response 804 with the BCMCS content information to the network controller 102. Further, the network controller 104 provides the BCMC content information to, for example, the BSC 212, using a configure flow request 806. The configure flow request 806 can be stored in a storage media, for example, a queue, in the BSC 212. Based on the configure flow request 806, the BSC 212 sends a broadcast setup request 808 to the PCF 210. Further, the PCF 210 sends a broadcast registration request 810 to the BSN 208. The BSN 208 sends a radius access request 812 to the AAA server 216. The AAA server 216 registers and authenticates the BSC 212 instead of the AT 106 (as explained in FIGS. 5 and 6) to receive the BCMCS content.

Further, the AAA server 216 sends another radius access request 814 to the network controller 102. The network controller 104 then sends a radius access accept information 816 to the AAA server 216. The AAA server 216 sends another radius access accept information 818 to the BSN 208. The BSN 208 sends a broadcast registration reply 820 to the PCF 210. The PCF 210 sends a broadcast connect request 822 to the BSC 212. On receiving the broadcast connect request 822, the BSC 212 sends a configure flow response 824 to the network controller 102, for initiating transmission of desired BCMCS content. On receiving the configure flow response 824, the network controller 104 directs the content provider 204 to initiate transmission of the BCMCS content to the content server 202. Further, the network controller 104 instructs the content server 202 to initiate transmission of the BCMCS content to the BSC 212, using a start-flow request 826. For transmission of the BCMCS content to the BSC 212, a bearer channel is established between the content server 202 and the BSC 212. The bearer channel can be established by using channel elements such as the MR 206, the BSN 208, and the PCF 210. Further, the BSC 212 transmits the BCMCS content. In an embodiment the BCMCS content is transmitted to the AT 106.

In an embodiment, the content server 202 initiates transmission of the BCMCS content on receiving a request for the BCMCS content from at least one channel element. This is known as 'PULL'. For example, the content server 202 can transmit a cricket match, based on the request from the BSC 212. In another embodiment, the content server 202 can initiate transmission of the BCMCS content at a predefined schedule. This is known as 'PUSH'. For example, the content server 202 can initiate transmission of a football match at, for instance, 09:00 hours.

Figure 9:
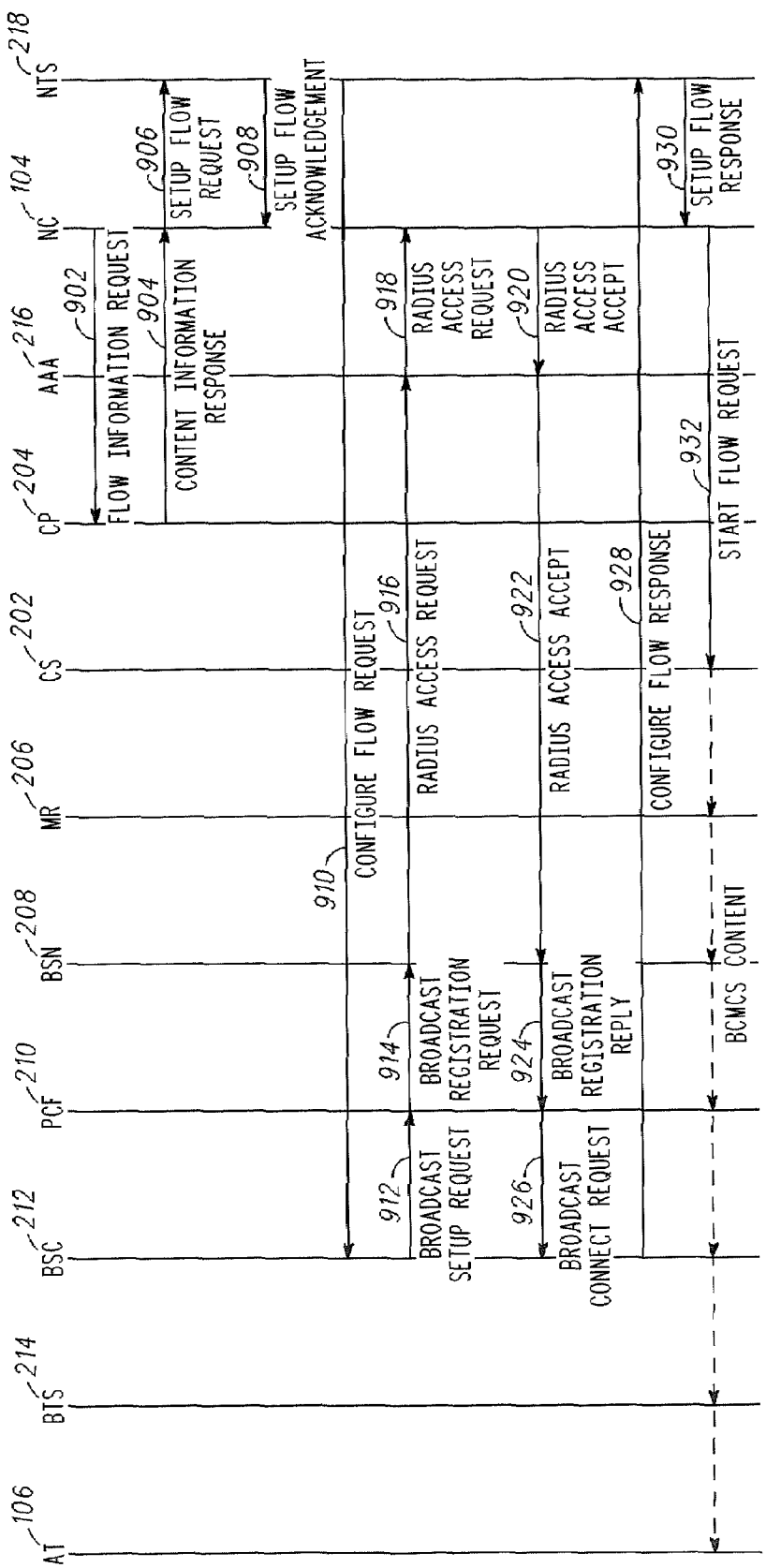
FIG. 9 representatively illustrates another BCMCS network-initiated flow setup, in accordance with the second exemplary embodiment of the present invention.

FIG. 9 representatively illustrates another BCMCS network-initiated flow setup, in accordance with the second exemplary embodiment of the present invention. First, the network controller 104 sends a flow information request 902 to the content provider 204 to obtain BCMCS content information. On receiving the flow information request 902, the content provider 204 sends a content information response 904 with the BCMCS content information to the network controller 102. The BCMCS content information can include details of the available BCMCS content with the content provider 204 and the schedule of the available BCMCS content.

Further, the network controller 104 sends a setup flow request 906 to the NTS 218 to provide the NTS 218 with BCMCS content information. On receiving the setup flow request 906, the NTS 218 sends a setup flow acknowledgement 908 to the network controller 102. Based on network topology information, the NTS 218 sends the BCMCS content information to, for example, the BSC 212, using a configure flow request 910. The configure flow request 910 can be stored in a storage media, for example, a queue in the BSC 212. Based on the configure flow request 910, the BSC 212 sends a broadcast setup request 912 to the PCF 210. Further, the PCF 210 sends a broadcast registration request 914 to the BSN 208.

The BSN 208 sends a radius access request 916 to the AAA server 216. The AAA server 216 registers and authenticates the BSC 212 instead of the AT 106 (as explained in FIGS. 5 and 6), to receive the BCMCS content. Further, the AAA server 216 sends another radius access request 918 to the network controller 102. The network controller 104 sends a radius access accept information 920 to the AAA server 216. The AAA server 216 sends another radius access accept information 922 to the BSN 208. Further, the BSN 208 sends a broadcast registration reply 924 to the PCF 210. Thereafter, the PCF 210 sends a broadcast connect request 926 to the BSC 212. On receiving the broadcast connect request 926, the BSC 212 sends a configure flow response 928 to the NTS 218. On receiving the configure flow response 928, the NTS 218 sends a setup flow response 930 to the network controller 102. Further, the network controller 104 directs the content provider 204 to initiate transmission of the BCMCS content to the content server 202. Further, the network controller 104 instructs the content server 202 to initiate transmission of the BCMCS content to the BSC 212, using a start flow request 932. For transmission of the BCMCS content to the BSC 212, a bearer channel is established between the content server 202 and the BSC 212. The bearer channel can be established by using channel elements such as the MR 206, the BSN 208, and the PCF 210. Further, the BSC 212 transmits the BCMCS content.

Figure 10:
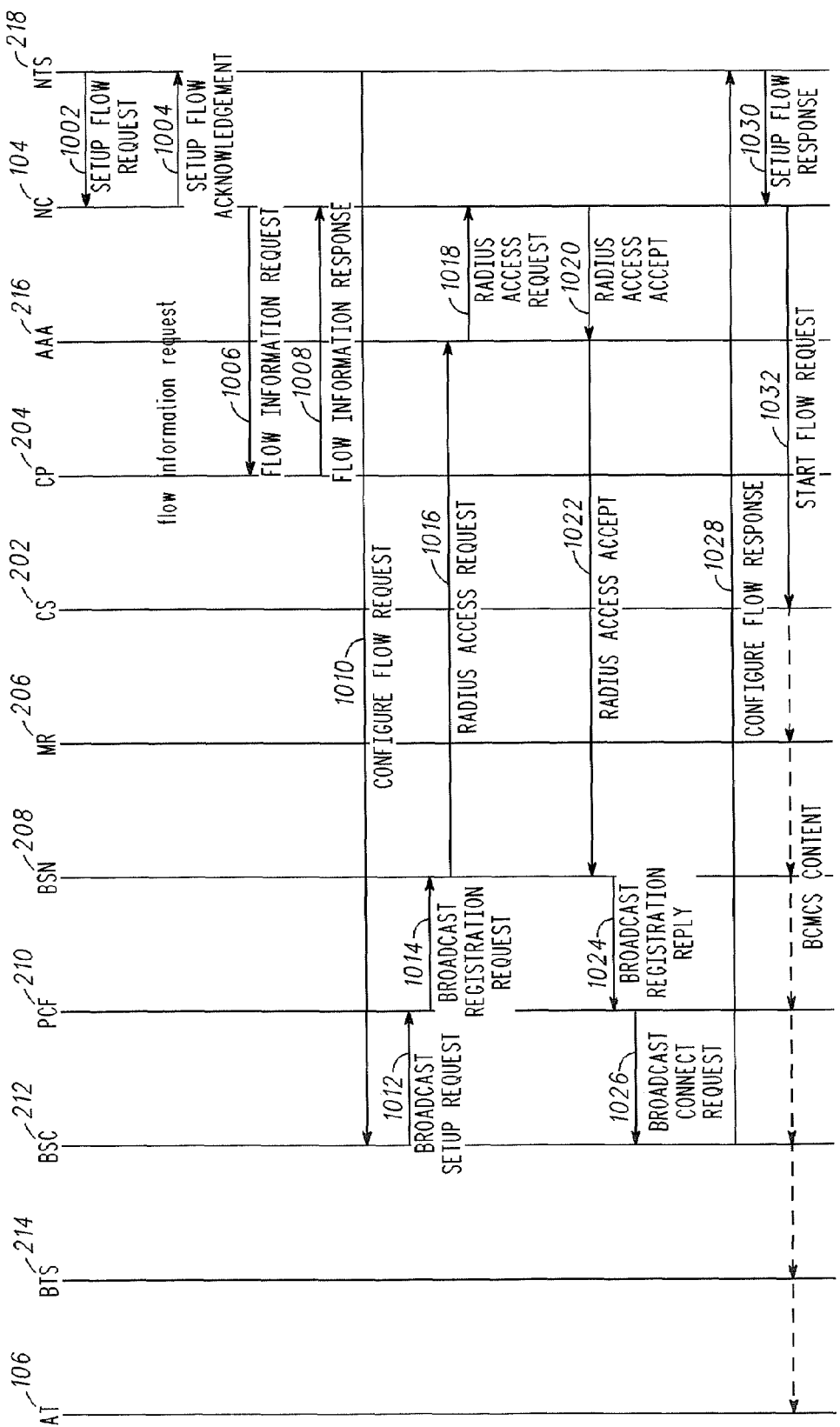
FIG. 10 representatively illustrates a BCMCS static flow setup, in accordance with the second exemplary embodiment of the present invention.

FIG. 10 representatively illustrates a BCMCS static flow setup, in accordance with the second exemplary embodiment of the present invention. According to known standards for a static flow setup, transmission of the BCMCS content can be initiated by operational commands, irrespective of any requests made for the BCMCS content. The one or more operational commands can be integrated into either the network controller 104 or the NTS 218. The one or more operational commands can be, for example, Operations, Administration, Maintenance & Provisioning (OAM&P) commands. In an embodiment, the one or more operational commands are integrated into the NTS 218.

First, the NTS 218 sends a setup flow request 1002 to the network controller 102. On receiving the setup flow request 1002, the network controller 104 sends a setup flow acknowledgement 1004 to the NTS 218. Further, the network controller 104 sends a flow information request 1006 to the content provider 204 to obtain BCMCS content information. On receiving the flow information request 1006, the content provider 204 sends a flow information response 1008 with the BCMCS content information to the network controller 102. Based on the network topology information, the NTS 218 sends the BCMCS content information to, for example, the BSC 212, using a configure flow request 1010. The configure flow request 1010 can be stored in a storage media, for example, a queue in the BSC 212. Based on the configure flow request 1010, the BSC 212 sends a broadcast setup request 1012 to the PCF 210. Further, the PCF 210 sends a broadcast registration request 1014 to the BSN 208. The BSN 208 sends a radius access request 1016 to the AAA server 216. The AAA server 216 registers and authenticates the BSC 212 instead of the AT 106(as explained in FIGS. 5 and 6), to receive the BCMCS content.

Further, the AAA server 216 sends a radius access request 1018 to the network controller 102. The network controller 104 sends a radius access accept information 1020 to the AAA server 216. The AAA server 216 sends a radius access accept information 1022 to the BSN 208. The BSN 208 sends a broadcast registration reply 1024 to the PCF 210. The PCF 210 sends a broadcast connect request 1026 to the BSC 212. On receiving the broadcast connect request 1026, the BSC 212 sends a configure flow response 1028 to the NTS 218. On receiving the configure flow response 1028, the NTS 218 sends a setup flow response 1030 to the network controller 102. Further, the network controller 104 directs the content provider 204 to initiate transmission of the BCMCS content to the content server 202. Thereafter, the content server 202 initiates transmission of the BCMCS content on receiving a request for the BCMCS content from at least one channel element at the network controller 102. This is known as 'PULL'. For example, the content server 202 can transmit a baseball match when requested by the BSC 212. In another embodiment, the content server 202 initiates transmission of the BCMCS content according to a predefined schedule. This is known as 'PUSH'. For example, the content server 202 can initiate transmission of a football match at, for instance, 09:00 hours.

Further, the network controller 104 instructs the content server 202 to initiate transmission of the BCMCS content to the BSC 212, using a start flow request 1032. For transmission of the BCMCS content to the BSC 212, a bearer channel is established between the content server 202 and the BSC 212. The bearer channel can be established by using such channel elements as the MR 206, the BSN 208, and the PCF 210. Further, the BSC 212 transmits the BCMCS content to the AT 106.

The present invention builds on 3GPP2 definitions and provides control to operators of a communication network. Further, the present invention supports 'PUSH' and 'PULL' models for BCMCS content deployment for all flow types, namely, dynamic flow, static flow and network-initiated flow. In an embodiment of the present invention, the network controller directs all channel elements and has network topology knowledge. In another embodiment, the network controller directs all channel elements, whereas the Network Topology Server (NTS) has the network topology knowledge. In yet another embodiment, the NTS directs all the channel elements and has topology knowledge. The introduction of the NTS ensures separation between service and network knowledge in the communication network. Further, this allows the network controller to focus on service aspects without requiring knowledge of the network. Furthermore, this allows the communication network to overlay BCMCS service without requiring knowledge about the source of the service. Further, the present invention reduces the complexity of the implementation of the network controller. Moreover, the present invention makes enforcement of Service Level Agreements (SLAs) easier.

In the foregoing specification, the invention has been described with reference to specific exemplary embodiments; however, it will be appreciated that various modifications and changes may be made without departing from the scope of the present invention, as set forth in the claims below. The specification and figures are to be regarded in an illustrative manner, rather than a restrictive one, and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements, without departing from the general principles of the same.

The invention claimed is:

1. A method for providing a Broadcast/Multicast Service (BCMCS) content to at least one access terminal (AT) in a communication network, the method comprising:
   receiving a request for the BCMCS content from the at least one AT, the request being received at a network controller in the communication network;
   directing a content server in the communication network to initiate transmission of the BCMCS content to the at least one AT, the content server being directed by the network controller based on the request from the at least one AT and network topology information stored at one of the network controller and a Network Topology Server (NTS); and
   establishing a BCMCS bearer channel between the content server and the at least one AT for transmitting the BCMCS content, the BCMCS bearer channel being established using at least one channel element.

2. The method as recited in claim 1, wherein directing the content server in the communication network comprises instructing the content server to transmit the BCMCS content to the at least one AT according to a predefined schedule.

3. The method as recited in claim 1 further comprising providing BCMCS content information from the network controller to the at least one AT.

4. The method as recited in claim 1 further comprising directing a content provider to initiate the transmission of the BCMCS content to the content server, the content provider being directed by the network controller.

5. The method as recited in claim 1 further comprising authenticating the at least one AT at one of the network controller, an Authentication Authorization and Accounting (AAA) server and a content provider in the communication network.

6. The method as recited in claim 1 further comprising providing the BCMCS content from the content server to the at least one AT over the BCMCS bearer channel.

7. The method as recited in claim 1, wherein the at least one AT is selected from the group comprising a mobile phone, a computer, a Personal Digital Assistant (PDA), and a laptop.

8. The method as recited in claim 1, wherein the at least one channel element is selected from the group comprising a Multicast Router (MR), a Broadcast Serving Node (BSN), a Packet Control Function (PCF), a Base Station Controller (BSC), and a Base Transceiver Station (BTS).

9. A method for providing a Broadcast/Multicast Service (BCMCS) content in a communication network, the method comprising:
   providing BCMCS content information to at least one channel element in the communication network based on network topology information stored at one of a network controller and a network topology server (NTS) in the communication network;
   registering the at least one channel element at the network controller; and
   directing a content server in the communication network to initiate transmission of the BCMCS content to the at least one channel element.

10. The method as recited in claim 9, wherein the at least one channel element is selected from the group comprising a Multicast Router (MR), a Broadcast Serving Node (BSN), a Packet Control Function (PCF), a Base Station Controller (BSC), and a Base Transceiver Station (BTS).

11. The method as recited in claim 9 further comprising initiating transmission of the BCMCS content information from a content provider in the communication network to the network controller prior to providing the BCMCS content information to the at least one channel element, wherein the transmission of the BCMCS content information is initiated at one of the network controller and the NTS.

12. The method as recited in claim 9 further comprising initiating transmission of the BCMCS content information from a content provider in the communication network to the network controller prior to providing the BCMCS content information to the at least one channel element, wherein the transmission of the BCMCS content information is initiated by one or more operational commands integrated into one of the network controller and the NTS.

13. The method as recited in claim 9, wherein registering the at least one channel element comprises enlisting the at least one channel element as a proxy to an access terminal (AT) at one of the network controller, the NTS, an Authentication Authorization and Accounting (AAA) server and a content provider in the communication network.

14. The method as recited in claim 9 further comprising receiving a request for the BCMCS content at the network controller prior to directing the content server to initiate the transmission, wherein the request for the BCMCS content is received from the at least one channel element.

15. The method as recited in claim 9 further comprising transmitting the BCMCS content from the at least one channel element to one or more access terminals (ATs).

16. The method as recited in claim 9, wherein directing the content server in the communication network to initiate the transmission of the BCMCS content to the at least one channel element comprises instructing the content server to transmit the BCMCS content to the at least one channel element based on one of a request from the at least one channel element and a predefined schedule.

17. A Network Topology Server (NTS) for managing a Broadcast/Multicast Service (BCMCS) content in a communication network, the NTS comprising:

a control module capable of providing BCMCS content information to at least one channel element in the communication network;

a network topology module capable of storing topology information of the communication network; and a flow control module capable of directing a network controller in the communication network to initiate transmission of the BCMCS content, the BCMCS content being transmitted from a content server in the communication network to the at least one channel element.

18. The NTS as recited in claim 17, wherein the control module further comprises one or more operational commands for initiating the transmission of the BCMCS content information from a content provider.

19. The NTS as recited in claim 17, wherein the flow control module is further capable of accepting flow information from the network controller to initiate transmission of the BCMCS content.

20. The NTS as recited in claim 17, wherein the at least one channel element is selected from the group comprising a Multicast Router (MR), a Broadcast Serving Node (BSN), a Packet Control Function (PCF), a Base Station Controller (BSC), a Base Transceiver Station (BTS).

\* \* \* \* \*